(12) United States Patent
Lobmeyer

(10) Patent No.: US 8,128,718 B2
(45) Date of Patent: Mar. 6, 2012

(54) COMPOSITIONS AND METHODS FOR REMOVING SCRATCHES FROM PLASTIC SURFACES

(75) Inventor: Lynette Dee Lobmeyer, Broomfield, CO (US)

(73) Assignee: Plastek, LLC, Signal Hill, CA (US)

( * ) Notice: Subject to any disclaimer, the term of this patent is extended or adjusted under 35 U.S.C. 154(b) by 741 days.

(21) Appl. No.: 12/136,164

(22) Filed: Jun. 10, 2008

(65) Prior Publication Data

US 2009/0098806 A1   Apr. 16, 2009

Related U.S. Application Data

(63) Continuation of application No. 11/112,963, filed on Apr. 22, 2005, now abandoned.

(51) Int. Cl.
*B24D 3/02* (2006.01)
*C09C 1/68* (2006.01)
*C09K 3/14* (2006.01)
*B24B 1/00* (2006.01)
*B24C 1/00* (2006.01)

(52) U.S. Cl. ............................... 51/309; 51/308; 451/36
(58) Field of Classification Search .................... 51/308, 51/309; 451/36
See application file for complete search history.

(56) References Cited

U.S. PATENT DOCUMENTS

| 4,051,056 A * | 9/1977 | Hartman | 510/369 |
| 4,347,151 A * | 8/1982 | Lohr et al. | 510/398 |
| 5,407,615 A * | 4/1995 | Norville | 264/36.1 |

* cited by examiner

*Primary Examiner* — Anthony J Green
*Assistant Examiner* — Pegah Parvini
(74) *Attorney, Agent, or Firm* — Waddey & Patterson, P.C.; James R. Cartiglia; Rebecca M. Barnett

(57) ABSTRACT

A composition including an abrasive, a suspension agent, a surfactant, and a lubricant, is provided for removing scratches, hazing, discoloration, and other defects from plastic surfaces. The composition is applied to a surface and used to polish the surface. The defects within the surface are removed without the removal of significant amounts of the material. Accordingly, the present invention removes defects from surfaces without creating optical distortion.

12 Claims, No Drawings

COMPOSITIONS AND METHODS FOR REMOVING SCRATCHES FROM PLASTIC SURFACES

CROSS REFERENCE TO RELATED APPLICATIONS

The present application is a Continuation of U.S. application Ser. No. 11/112,963 filed on Apr. 22, 2005, which is now abandoned.

BACKGROUND OF THE INVENTION

In recent years, plastics have been used increasingly in place of glass as a cover or surface of choice for many applications such as watch faces, windows and table surfaces. The advantage of using plastic is that it is more lightweight, less brittle, stronger, and far less likely to break than glass. However, one of the drawbacks of using plastic is that its surface is not nearly as hard as glass. Consequently, it is much more prone to being scratched by hard objects or debris, such as metal, glass, sand, grit, or any other abrasive material. In addition, plastics are more prone to hazing or surface yellowing due to weathering, which is often caused by oxidation or the influence of ultraviolet light from the sun. Such discoloration also can occur through ordinary cleaning of plastic surfaces. Not surprisingly, while the surface of glass might remain clear for many years, plastic often becomes clouded, yellowed or otherwise opaque through oxidation and by other corrosive forces found in nature.

Plastic is the material of choice for making motorcycle windshields and airplane or jet windows, all of which must withstand high wind forces and pressure differentials. However, due to such high speed winds, damage to the windshields and windows is very likely.

Within the field of aviation and more particularly, in the area of airplane windows, having clear plastic windows is desirable. Commonly the windows are often scratched, yellowed, or otherwise partially opaque. Besides being merely bothersome to the passenger, such damage can also severely impair the ability of the pilot to see the landscape outside the plane, creating a danger to all aboard. However, the discomfort and negative feeling such window damage can cause to passengers should not be overlooked.

Four airline companies, American Airlines, Delta Airlines, United Airlines and Sky West Airlines, conducted a customer survey and found that the customers' single greatest complaint concerned damage to the planes' windows, and more specifically, that the windows were so scratched that the customers had difficulty seeing through them much of the time. The survey showed that some of the customers surveyed drew a psychological correlation between the poor condition of the windows and the level of maintenance of the rest of the plane. Another specific and related complaint involved customers who wished to take photographs of the scenery below through the windows, but who were unable to do so due to the poor condition of the windows. Although the scratched windows pose no real safety risk to the airline passengers, customer satisfaction and enjoyment is important to any business venture including that of common carriers like airlines.

In addition to commercial aircraft (of which there are some 13,000 in the United States alone) there are approximately 250,000 private planes in the United States and approximately 15,000 helicopters. Although the price of replacing the windows of these aircraft may vary according to the size, shape and materials in the window, it costs approximately $75,000 to completely replace the windows of a typical Lear 25-D jet.

In the military arena, where clarity of vision is a priority, there are tens of thousands of aircraft. In the "Gulf War" alone there were 1,700 U.S. military planes in action, many of which experienced window damage as a result of the high speed, low level flying in the sandy conditions of the Arabian deserts, or when simply sitting on the runway and being exposed to blowing sand. The cost to replace the canopies of various military fighter planes and bombers can be between about $20,000 to about $80,000 per aircraft.

Currently, technology exists to remedy the problem of scratching, hazing, and oxidation of plastic surfaces, particularly aircraft windows, but it is prohibitively expensive, requiring large amounts of both capital and labor. The current best method of scratch removal involves the use of a robotic polishing machine, a machine which typically ranges in cost from $500,000 to $1,500,000. Another drawback, in addition to the cost of initial investment, is that this machine can only polish the windows after they have been removed from the plane, which is a very time consuming and labor intensive process. It also usually requires the removal of several thousandths of an inch of the window surface to adequately remove the deeper scratches. This removal of material presents a problem under safety regulations which establish minimum thicknesses. Often, much of the plane's interior must be disassembled. Yet another factor is that the machine can only polish four windows per hour, and it requires two employees to operate. In addition to the high costs of both machine and labor, there is also the cost of the chemicals.

Another cost which must be considered is the "down time" required to remove the windows, polish them, and then reassemble them into the aircraft. Most commercial aircraft have many windows and it is not uncommon to take from between six and eight days to remove and polish every window of a plane. Consequently most airlines have chosen to forego this process as evidenced by the generally poor condition of commercial airline windows. In addition to the expensive robotic polishing machine method set forth above, another sanding system bearing the tradename Micro-Mesh has been used to remove the scratches of plastics. The MicroMesh sanding system (a product of Micro-Surface Finishing Products, Inc. of Wilton, Iowa) uses a series of rubber-backed sanding cloths with differing sizes of grit. The first step uses a sanding cloth having 2,400 gauge grit. In subsequent steps, sanding clothes of finer grades up to 12,000 gauge grit are used, In addition to using the rubber sanding block, a small amount of antistatic cream is applied after polishing is complete.

The drawbacks of using the Micro-Mesh system, as well as the robotic system as presently used, is that a large amount of plastic must be sanded away in order to remove even the smallest of scratches. In addition, a sizable area of plastic must be removed in order to avoid causing optical distortion of the plastic in the surrounding area where the scratch was removed. Another problem of the Micro-Mesh sanding system is the large amount of time it takes to perform each of the series of sandings for each type of pit.

What these two systems (robotic polishing and Micro-Mesh sanding) have in common is that in order to remove a scratch from the surface of the plastic, it is necessary to remove enough of the plastic surface to at least equal the depth of the scratch, and in most cases even more. To avoid optical distortion, the individual performing the scratch removing operation must possess a high level of skill and patience, which requires a high amount of training. Moreover, repeated scratch removals using these systems will greatly reduce the thickness of the plastic and destroy its desired protective properties. Reduced thickness can cause a window to fail airworthiness standards.

The U.S. Air Force has reported that because many windshields are manufactured to meet strict optics requirements, any removal of plastic or acrylic material during scratch removal can alter their optical qualities. In such cases, present scratch removal systems are essentially useless because in curing one problem (scratches) they create another (optical distortion).

In addition to airplane windows, there are hundreds of other applications which require clear, highly visual plastics, but good visibility is often hindered because of scratches, oxidation and other opaqueness due to environmental influences. For example, schools around the country are switching from glass windows to windows made of Lexan, a product of General Electric Corp., in order to make them vandal-proof. Transit districts and schools around the country are switching from glass to plastic windows in their buses for the same reasons. In addition, new federal mandates now require trains to change all of their windows to plastic in order to make them safer. Motorcycle windscreens are typically made of plexiglass, which is not glass, but a type of polymeric plastic. Skiing enthusiasts are often disappointed when their gondola or tram is badly hazed or scratched, preventing the panoramic view they come to expect. Similarly, golfer's like a clear view from their golf carts.

Other common uses for plastic materials are watch crystals, gauge faces, eyeglasses, goggles, and laser discs, such as audio compact discs, picture discs, video laser discs and computer CD-ROM and -RAM disks No practical methods are available for removing scratches from these surfaces at reasonable cost and in a timely manner.

What is needed, then, is a composition that may be used to remove defects in a plastic surface in a timely manner without removing such a significant amount of surface material such that optical distortion occurs.

SUMMARY OF THE INVENTION

The present invention provides a system for removing defects from plastic surfaces, which includes a plurality of compositions such as a coarse (or principal) polish and a finishing polish. The invention also provides methods of using the compositions. The compositions include an abrasive, a suspension agent, a surfactant, a solvent, a fungicide and a lubricant. The abrasive may vary in quantity or size depending on the type of defect being removed from a plastic surface. The suspension agent employed can comprise a blend of a suspension agent having a thixotropic quality and a suspension agent having a constant viscosity in order to provide a composition producing surprising results with regard to removing defects from plastic surfaces without removing significant amounts of the surface which would result in optical distortion. The inventive compositions may also include pigments and fragrances.

In certain embodiments of the present invention, the finishing polish includes from about 15% to about 27% by weight of abrasive, from about 2.5% to about 9% by weight of a thixotropic suspension agent, from about 1.5% to about 5% by weight of a surfactant, and from about 0.3% to about 2.5% by weight of a lubricant. The finishing polish can also include up to about 22%, more preferably from about 10% to about 19% by weight of a non-aqueous solvent, with the balance of the solvent aqueous in nature.

The principal or coarse polish preferably includes at least about 35%, and more preferably about 35% to about 55% by weight of an abrasive, no more than about 2.5%, more preferably from about 0.4% to about 1.9%, by weight of a surfactant, about 5% to about 12% by weight of a non-aqueous solvent and about 1.3% to about 3.5% by weight of a suspension agent having a thixothropic quality.

Each of the principal and finishing polishes can also include a minor amount of a fungicide, preferably not more than about 0.4%, more preferably from about 0.02% to about 0.09% by weight.

The compositions disclosed herein are used in methods of removing defects from plastics. Briefly, the method of removing deep defects in plastics includes providing the plastic surface, applying the principal polish composition disclosed herein having large mesh size abrasives, polishing the plastic surface, applying the finishing polish composition disclosed herein having small mesh size abrasives, and polishing the plastic surface. Alternatively, the two polishes can be used independently of each other, depending on the nature of the defects in the surface to be polished. The methods disclosed herein may be applied to any plastic surface, especially the surface of an aircraft window.

Therefore, one aspect of the present invention is to provide a composition that removes defects from plastic surfaces without removing significant amounts of the surface material.

Another aspect of the present invention is to provide a composition which quickly removes defects, or imperfections, from plastic surfaces.

Yet another aspect of the present invention is to provide a composition for, and method of, removing defects from plastic surfaces without the use of complicated equipment and machinery.

Another aspect of the present invention is to provide a composition for, and method of, removing defects from plastic surfaces without also requiring the removal of the surrounding plastic surface in an amount equal to the depth of a scratch.

Another aspect of the present invention is to provide a composition for, and method of, removing scratches, hazing, and discoloring of plastic surfaces without causing optical distortion from excessive removal of the plastic surface.

Another aspect of the present invention is to provide compositions and methods for removing scratches, hazing, and discoloration of windows wherein the windows do not have to be removed.

Still another aspect of the present invention is a removal of defects in plastic surfaces which does not require removal of a substantial thickness of the plastic.

Still another of the present invention is the removal of defects in plastic surfaces wherein the use of volatile organic compounds is limited or eliminated.

DESCRIPTION OF THE PREFERRED EMBODIMENTS

The present invention relates to compounds and methods for removing scratches and other imperfections in the surface of plastics. More particularly, the present invention is directed to compounds, and methods for using the same, which can remove scratches and other defects from the surface of plastics in order to improve the optical quality of the plastic in the situation where plastics have become scratched, or otherwise opaque or semi-opaque because of physical, chemical or light damage.

The present invention discloses novel compositions and methods for removing scratches and imperfections in the surface of plastics. In addition to scratches, hazing or yellowing may also be removed by the invention disclosed herein.

Such imperfections or flaws in the surface of plastic can be removed by applying to the plastic surface compositions described herein, which generally comprise an abrasive or blend of abrasives suspended in a solution of water and suspension agents. The composition may also include a surfactant, and a lubricant, or moisture retainer, which prevents any moisture within the composition from evaporating due to heat of friction. The surfactant is added to improve the cleaning properties by holding abrasives in suspension. Additionally, pigment and fragrance may be added for aesthetic purposes.

Also disclosed herein are methods of using the disclosed compositions to remove defects or flaws in the surface of plastic. In certain embodiments, the method includes providing a plastic surface and applying the composition by conventional means of hand-held buffing or polishing machines, or by hand, and polishing, buffing, or burnishing the plastic surface. The compositions disclosed herein and the methods of use thereof may be applied to any plastic surface, including but not limited to, watch crystals, gauge faces, eyeglasses, goggles, compact discs, video laser discs, picture discs, or CD-ROM, or -RAM, aircraft windows, helicopter windows, motorcycle windscreens, or other plastic materials commonly used on gondolas, trams, or golf carts.

In certain embodiments of the present invention, defects or flaws such as scratches, hazing, or yellowing of aircraft windows may be removed as disclosed herein. Thus, pursuant to the present invention, scratches, hazing, discoloration, and other imperfections of aircraft windows may be corrected without requiring removal of the windows from the plane.

One important aspect of the present invention is that the compositions have been developed without the use of any unnecessary volatile organic hydrocarbons. The removal of volatile organic hydrocarbons has been in response to various state laws and regulations providing limitations regarding its use. The limitation or elimination of volatile organic hydrocarbons also eliminates the possibility of having solvents cause expansion or deterioration of rubber seals around windows repaired using the present invention.

Compositions for Removing Defects from Plastic Surfaces

The present invention relates to novel compositions for removing scratches, hazing, yellowing, and other imperfections from plastic surfaces, which can be used sequentially or independently. Generally, the compositions include an abrasive, a suspension agent which is thixotropic in nature, a surfactant, and a lubricant. In certain embodiments of the present invention, the compositions may also contain a pigment and/or a fragrance. Alternate embodiments of the present invention may include abrasives, water, and a blend of suspension agents, one of the suspension agents being thixotropic in nature and one of the suspension agents exhibiting a constant viscosity. Alternately, the compositions may also contain those components and a surfactant, and a lubricant. Depending on the application for which the compositions is used, the compositions may contain abrasives of various sizes.

Although this invention is not bound by theory or mechanism, the composition of the present invention works on the principle of buffing and polishing. Polishing is an abrading operation usually employed for removal or smoothing of scratches, pits, tool marks, grinding lines, and certain other surface defects that adversely affect the appearance or function of a surface. In the present application, the term polishing will generally be defined as a refurbishing of plastics such that the original optical clarity or lack of optical distortion is regained. The inventive compositions smooth plastic surfaces without any significant removal of the surface material.

Use of the compositions disclosed herein, according to the methods disclosed herein, does not strip away appreciable amounts of the plastic surface. However, even though the present invention does not remove a significant amount of material from the plastic surface, it is still able to eliminate scratches that once penetrated below the plastic surface. Consequently, no significant optical distortion results when a plastic object or window being treated.

In certain embodiments of the present invention, the composition disclosed herein includes a blend of at least two suspension agents, one suspension agent having constant viscosity and the second suspension agent having a thixotropic quality With regard to the suspension agents included in the inventive finishing polish, the thixotropic suspension agent is provided within the range of about 2.5% to about 9% by weight of the composition; in the coarse polish, the thixotropic suspension agent is provided within the range of about 1.3% to about 3.5% by weight of the composition. An example of a thixotropic suspension agent is magnesium aluminum silicate or a suspension of magnesium aluminum silicate available under the tradename Veegum from, e.g., R.T. Vanderbilt.

As discussed, a second suspension agent having a constant viscosity can also be present in the composition. The percentage of the suspension agent having a constant viscosity is from about 0.5% to about 15%. In certain embodiments of the present invention, the percentage of the suspension agent having constant viscosity is from about 1.0% to about 4.5%. Suitable suspension agents having constant viscosity include silicone oils such as dimethicone. With regard to both suspension agents, other suspension agents having similar qualities may also be used within the scope of the present invention.

The addition of two suspension agents allows the present invention to solve a problem commonly associated with polishing compositions. Briefly, with the two suspension agents together, the composition can become thin enough to be dispensed yet stay thick enough to be used in polishing and/or buffing. In order for any polishing material to be dispensable, it must think enough to flow. In plain water, many of the elements of any polishing material would immediately sink to the bottom of the container. Accordingly, there is a problem to be solved. The composition must be thin enough to flow while also being thick enough such that it does not spin out from under a buffer pad during polishing. The function of each of the suspension agents is to hold the abrasives in suspension. The combination of at least two suspension agents, one having a constant viscosity and the other having a thixotropic quality, has solved the problem. First, a suspension agent having a thixotropic property, which means that the composition liquifies when stirred or shaken and returns to a thicker state upon standing. Thus, that suspension agent allows the composition to become thin enough to be dispensable. However, the second suspension agent is needed since the constant pressure applied by a buffer pad during polishing would cause the thixotropic material to thin out to the point where it spins out from under the buffer pad and therefore becomes useless. Accordingly, the constant viscosity suspension agent keeps the composition in a thicker state so that it will not spin out from under the buffer pad during use. It should also be noted that the viscosity of the composition can be adjusted from a portable liquid to a stiff gel through the mixture of different quantities of the two suspension agents.

Regarding the surfactant, the surfactant improves the cleaning properties of the composition of the present invention by holding in suspension any dirt and/or grease on the surface of the plastic being repaired. The surfactant also helps to solubilize certain ingredients in the present invention, including fragrances and anti-static agents. Finally, the surfactant provides a lubrication function for the composition and helps to keep the abrasives of the composition on the buffer pad during use. Further, the surfactant aids in the movement of the buffer pad over the surface of the plastic being repaired. In certain embodiments of the present invention, the percentage of the surfactant in the finishing polish composition is in the range of about 1.5% to about 5%; in the coarse polish it is about 0.4% to about 1.9%. Suitable surfactants include low foaming surfactants such as the Triton class of surfactants available from Dow Chemical Company. On especially useful surfactant is commercially available under the tradename Triton DF-16. It should be understood, however, that any surfactant having the characteristics and qualities disclosed herein may be used in the present invention.

The compositions of the present invention preferably also include a lubricant, or moisture retainer. An example of such a lubricant is propylene glycol which is used to prevent the moisture of the compositions from evaporating due to heat of friction during use. Alternatively, glycerine may also be used, but it is more expensive. Without a lubricant, or moisture retainer, the compositions would tend to dry out and be more difficult to remove after the repair of a plastic surface is complete. In certain embodiments of the present invention, the lubricant may be provided in the range from about 0.3% to about 2.5% of the composition. It is understood that any suitable lubricant having qualities similar to those disclosed herein are within the scope of the present invention.

Another reason for the lubricant is that, in its absence, an excessive powder or dust could be generated when using the composition. Such a dust could gather as a coating of dust and be deposited on the plastic surface. Such a coating would tend to adhere to the surface by operation of static electricity such that removal might well result in the formation of new scratches. Again, the lubricant retains moisture in the compound and also provides stability to the mixture.

As noted, the inventive compositions also each include an abrasive. Indeed, the polish compositions can each include a blend of abrasives of different sizes. Generally, relatively large particles are used for eliminating deep scratches and weathered haziness. It is preferred that relatively soft abrasive materials be used when using large particles so that the large particles will break down to smaller particles as they are used. Such smaller particles are useful for continuing repair of the plastic surface as the scratches on the plastic surface become less deep. Accordingly, use of large, hard abrasive particles can actually cause scratching if used too long.

The percentage of abrasives in the finishing polish is from about 15% to about 27% of the composition, more preferably from about 17% to about 22% of the composition by weight. With respect to the coarse polish, the percentage of abrasives in the polish is from about 35% to about 55% of the composition, more preferably from about 40% to about 50% of the composition by weight.

It is understood that many types of abrasive material may be used. Examples of such abrasive material include aluminum silicate, diatomaceous silica, alumina, zirconia, celite diatomaceous silica and boehmite alumina. Such abrasive materials are commonly commercially available to those in the art. Other suitable abrasives include borosilicate, calca alumina, magnesium alumina sulfate, carboxylmethyl cellulose, kaolinitic quartz, and silicon dioxide. These abrasives are well known in the art and are commercially available. Other abrasives having similar characteristics can also be employed with success.

The compositions disclosed herein may also contain a non-aqueous (or organic) solvent, such as mineral spirits, present at a level of up to about 22% by weight of the compositions. With respect to the finishing polish, the organic solvent is preferably present at a level of about 10% to about 19%; with respect to the coarse polish, the organic solvent is preferably present at a level of about 5% to about 12% by weight. The function of the organic solvent is to soften the high points of the scratches on the plastic surface, while the heat generated by the polishing process is believed to rearrange the molecular structure of the surface while not affecting the lower substrate level. Other organic solvents having suitable characteristics can also be used.

In certain embodiments of the present invention, color and or fragrance may also be added to the composition. Pigments and fragrances may be added to the compositions of the present invention in amounts in the range of from about 0.01% to about 1.0%. An example of the suitable pigment for the present invention is 1-(3-chlorallyl)-3,5,7,-triaza-1-azonia-adamantane chloride such as Dowicil 75 available from Dow Chemical of Midland, Mich. With regard to fragrance, an example of a fragrance which is suitable for the present composition is coconut fragrance 98764 available from Drom International, Inc. of Towaco, N.J.

If desired, a fungicide, such as benzalkonium chloride, or other ammonium salts, can be included in the inventive polishes, at a level of not more than about 0.4%, and more preferably from about 0.02% to about 0.09% by weight. Other fungicides can also be included, as desired by the artisan.

It is understood that the balance of the inventive compositions is made up of water. In certain embodiments of the present invention, dionized water is used.

Methods of Using the Plastic Surface Repair Compositions

The present invention includes methods of using the inventive polishes disclosed herein in order to remove defects from the surface of plastics. Generally, each method includes providing a plastic surface, applying at least one of the compositions disclosed herein to the plastic surface (and preferably both compositions in seriatim), polishing the plastic surface, and repeating the steps of application and polishing, or buffing, as needed until the defects are removed from the plastic surface. The compositions disclosed herein can be applied in the same way as conventional polishing compounds. Accordingly, the compositions disclosed herein may be applied by hand using a soft, open-cell polyester foam buffing pad or a soft cotton cloth using a reciprocating motion. It is understood that other buffing pads or cloth material which are suitable may be used for applying the compositions disclosed herein. Additionally, when applying the compositions by hand, a reciprocating motion is desirable over a circular motion.

Alternatively, the compositions disclosed herein may be applied by means of conventional hand-held buffing or polishing machines, such as rotary, orbital, or oscillating polishing machines, using an open-cell polyester buffing pad. It is understood that other suitable buffing pads or cloth material may be used with such machines. The depths of the defects in the plastic surface may be a consideration when deciding on a method of applying the compositions disclosed herein. For example, a method of application for removing scratches from airplane, or aircraft, windows is to apply the compositions disclosed herein by means of conventional hand-held buffing or polishing machines. Alternatively, for lighter scratches as in watch crystals, compact discs, laser video discs, picture discs, or CD-ROM or -RAM, it may be preferable to apply the compositions disclosed herein by hand.

Finally, an alternate method of applying the compositions disclosed herein is to use the expensive robotic machines commonly known in the prior art since the compositions disclosed herein are compatible with such existing polishing systems presently used to repair aircraft windows.

It is understood that almost any type of buffing cloth will work with compositions of the present invention, including the aforementioned open-cell polyester material and cotton pads. Fleece, wool, linen, open-cell polyurethane, rigid polyurethane, glass wool, and most other natural and synthetic materials work well. The only restraint on the buffing pad is that it be sufficiently durable to withstand the mechanical forces of the buffing process. Accordingly, the stiffness of the buffing pad should be commensurate with the difficulty of the repair job being performed, yet without the buffing pad materials being so hard that they will scratch the plastic surface.

With regard to removing defects in plastic surfaces, the process of polishing removes material from the plastic surface and to a slight degree is believed to cause some plastic reworking on the surface. The polishing process may be followed by a buffing process unless the desired finish is smooth enough after the polishing process. The buffing process produces smooth, reflective, scratch-free surfaces by bringing the plastic surface into contact with a revolving foam buffing wheel treated with an appropriate composition. The action of the wheel either cuts or flows the plastic surface in order to remove minor defects in the surface and impart a smooth lustrous finish. The buffing process serves to complete the method of using the compositions disclosed herein and produces a scratch-free, and defect free plastic surface. The polishing process and the buffing process are well known to those in the art.

The buffing process may result in a burnishing effect which leaves the entire plastic surface largely intact without significant loss of the material. The burnishing effect results from the plastic surface being flowed by pressure, speed, and heat of the buffer in combination with the hardness of the abrasive. Burnishing is particularly important on soft materials, or when it is important not to lose any of the surface of the item being repaired. Again, significant loss of the plastic surface may result in optical distortion, which is not desired.

As described above, the compositions of the present invention are effective in removing scratches from plastic surfaces without removing much of the plastic surface, if any. The commonly known methods in the art result in significant removal of the plastic surface which results in optical distortion. The compositions and methods of use disclosed herein do not result in the massive removal of the plastic surface. In certain embodiments of the present invention, when burnishing occurs, the plastic surface is not removed, but there is a mere rearranging of the molecular structure of the plastic surface without affecting the substrate levels. Furthermore, the present invention provides quicker results compared to the methods currently used for removing defects from plastic surfaces. For example, with regard to removing defects from aircraft windows, the method disclosed herein in certain embodiments, may be completed within 5 or 10 minutes. Such an amount of time is significantly less than the hours currently required by using the conventional methods.

In certain embodiments of the invention, the plastic surface is cleaned to remove dirt, etc. and static electricity. Such cleaning may be accomplished by use of an anti-static compound, as disclosed herein. Plastic surfaces in need of repair due to significant damage generally require use of a composition disclosed herein having larger sized abrasive particles. After the application and use of such a composition, a finer finish of the plastic surface is accomplished by applying a composition disclosed herein having smaller sized abrasive particles. In certain embodiments, an anti-static compound is used to clean the plastic surface before the application of additional compositions that are disclosed herein. Furthermore, it is generally preferable that a stiffer buffing pad be used to remove deep scratches on the plastic surface, and a softer buffing pad be used in finishing the repair while using a composition disclosed herein having smaller sized adhesive particles. Also, when repairing imperfections, or flaws on a large plastic surface, such as plastic windows, the compositions disclosed herein may be applied using a conventional hand-held buffing or polishing machine having fixed or variable speeds, such as a rotary, orbital, or oscillating polishing machine, and an appropriate pad. Commercial suppliers for such polishing machines are well known to those of skill in the art.

When a plastic surface has larger scratches, a coarse polish composition disclosed herein having a larger mesh size abrasive material is applied to the plastic surface. An abrasive material is considered to have a larger mesh size if the abrasive material, or particles, are at least about 6 microns in diameter, and average between about 6 microns and about 30 microns, most preferably, between about 10 microns and about 20 microns in diameter. In the next step, a finishing polish composition disclosed herein containing smaller mesh size abrasive particles is applied to the plastic surface and used to polish the plastic surface. The abrasive materials or particles, are considered to have a small mesh size if the particles are smaller in average diameter than the larger mesh size particles, and are no more than about 18 microns in diameter, and average from about 2 microns to about 18 microns. In certain embodiments, abrasive materials or particles, are considered to have a small mesh size if the particles average from about 2 microns to about 6 microns in diameter.

Generally, for smaller scratches in the plastic surface, one of the compositions disclosed herein which contains even finer gauge abrasive particle will be used initially and fewer successive steps of polishing are required. Abrasive materials, or particles, having a very small mesh size are particles having a size of no more than about 5 microns in diameter, and average from about 1 micron to about 4 microns.

In order to remove very fine scratches, hazing or surface yellowing, it is typical to use a composition disclosed herein with a very small mesh size of abrasive particles. By way of example, the size of the abrasive particles having a very small mesh size have been disclosed above. Typically, the method of using such compositions disclosed herein requires only one or two steps. Additionally, in certain embodiments of the present invention, application of, and polishing with, such compositions having a very small mesh size of abrasives use a buffing pad or cloth which is softer.

The buffing pad or buffing cloth, or material, should be selected based upon the rigidity or durability required of the buffing pad in order to accomplish the repair of the plastic surface. One of skill in the art is capable of making that selection based upon the magnitude and depth of the scratches and/or imperfections present on the plastic surface.

It is noted that before the process of using the compositions disclosed herein is started, that the plastic surface to be repaired is washed with an anti-static compound which cleans the surface and removes static electricity. An example of such an anti-static compound is Briallianz, which is commercially available from New Finish Products of Cordelia, Calif. Such anti-static compounds are well known in the art. It is additionally noted, in certain embodiments, that a suitable anti-static compound is applied between the applications and polishing of the compositions disclosed herein. The anti-static compound cleans and removes static electricity between the polishing steps of the methods disclosed herein. It is understood that equivalent anti-static compounds are within the scope of this invention.

In certain embodiments of the present invention, the method is completed by removing residual compositions from the plastic surface. Thus, after the plastic surface has been restored so that the defects have been removed, any residual compositions remaining on the plastic surface may be removed by wiping with a cloth. In certain embodiments of the present invention, residual compositions may be removed by wiping with a clean cloth to which an anti-static spray has been applied. An example of an anti-static composition, or spray, has been disclosed above. Alternatively, for areas where large amounts of any of the compositions have built up, such as in corners, removal of the excess composition may be accomplished by wiping the area with a damp cloth, or by spraying the surface with water and then wiping the area with a clean, dry cloth. Using solvents for this purpose should be avoided since many solvents can react with the plastic surface and generate a haze, which would reverse the benefit obtained by the present invention.

In certain embodiments of the present invention, polishing deep scratches in plastic is accomplished using a machine, as described herein. Commonly such polishing machines operate at 1800-3000 rpm. When polishing, the pad or cloth for polishing should be kept wet. Polishing can be accomplished at an rpm range of 1800 for 3-5 minutes for the first step of polishing. Subsequent steps in polishing use 1800-2600 rpm for 3-5 minutes, with an acceleration to a higher rpm toward the end of the 3-5 minute period.

This patent application incorporates by reference all references and publications disclosed herein. Thus, it is seen that the compositions and methods of the present invention readily achieve the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the following claims.

What is claimed is:

1. A composition for removing defects from surfaces, comprising:
   from about 40% to about 50% by weight of an abrasive comprising alumina;
   from about 1.3% to about 3.5% by weight of a thixotropic suspension agent; and
   from about 0.4% to about 1.9% by weight of a surfactant; and
   from about 0.3% to about 2.5% by weight of a lubricant.

2. The composition of claim 1, further comprising up to about 12% by weight of an organic solvent.

3. The composition of claim 1, further comprising from about 0.01% to about 1% by weight of a pigment.

4. The composition of claim 1, further comprising not more than about 0.4% of a fungicide.

5. The composition of claim 1, wherein the abrasive is formed of particles having a diameter greater than about 6 microns.

6. The composition of claim 1, further comprising from about 0.5% to about 15% of a suspension agent having a constant viscosity.

7. A method of removing defects from a plastic surface, comprising:
   applying a first composition to the plastic surface, the first composition, comprising;
      from about 40% to about 50% by weight of an abrasive comprising alumina having a particle size of at least about 6 microns in diameter;
      from about 1.3% to about 3.5% by weight of a thixotropic suspension agent; and
   from about 0.4% to about 1.9% by weight of a surfactant; and
   from about 0.3% to about 2.5% by weight of a lubricant;
   polishing the plastic surface;
      applying in a second step a second composition to the plastic surface, the second composition comprising:
      from about 15% to about 27% by weight of an abrasive having a particle size of no more than about 18 microns in diameter;
      from about 2.5% to about 9% by weight of a thixotropic suspension agent;
      from about 1.5% to about 5% by weight of a surfactant; and
      from about 0.3% to about 2.5% by weight of a lubricant; and
   polishing the plastic surface.

8. The method of claim 7, wherein the first composition further comprises up to about 12% by weight of an organic solvent.

9. The method of claim 7, wherein the second composition further comprises up to about 22% by weight of an organic solvent.

10. The method of claim 7, wherein each composition further comprises from about 0.01% to about 1% by weight of a pigment.

11. The method of claim 7, wherein each composition further comprises not more than about 0.4% of a fungicide.

12. The method of claim 7, wherein each composition further comprises from about 0.5% to about 15% of a suspension agent having a constant viscosity.

* * * * *